(12) United States Patent
Godet

(10) Patent No.: US 10,685,513 B2
(45) Date of Patent: Jun. 16, 2020

(54) METHOD FOR ACTIVATING A FUNCTION OF A MOTOR VEHICLE

(71) Applicants: Continental Automotive France, Toulouse (FR); Continental Automotive GmbH, Hannover (DE)

(72) Inventor: Sylvain Godet, Saint-Cezert (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 190 days.

(21) Appl. No.: 15/778,878

(22) PCT Filed: Nov. 18, 2016

(86) PCT No.: PCT/EP2016/001930
§ 371 (c)(1),
(2) Date: May 24, 2018

(87) PCT Pub. No.: WO2017/092847
PCT Pub. Date: Jun. 8, 2017

(65) Prior Publication Data
US 2018/0342122 A1 Nov. 29, 2018

(30) Foreign Application Priority Data
Nov. 30, 2015 (FR) .................................... 15 61607

(51) Int. Cl.
*H04B 17/00* (2015.01)
*H04B 17/27* (2015.01)
(Continued)

(52) U.S. Cl.
CPC ........ *G07C 9/00309* (2013.01); *B60R 25/245* (2013.01); *B60R 25/31* (2013.01);
(Continued)

(58) Field of Classification Search
CPC ...... G07C 9/00; G07C 9/00309; H04B 17/00; H04B 17/27; H04B 17/318; B60R 25/00; B60R 25/245; B60R 25/31
See application file for complete search history.

(56) References Cited

U.S. PATENT DOCUMENTS

2013/0069760 A1 3/2013 Lickfelt
2014/0188348 A1* 7/2014 Gautama ............... B60W 10/30
701/48
(Continued)

FOREIGN PATENT DOCUMENTS

FR 3007874 A1 1/2015

OTHER PUBLICATIONS

International Search Report and Written Opinion for International Application No. PCT/EP2016/001930, dated Dec. 19, 2016—9 pages.

*Primary Examiner* — Yonel Beaulieu
(74) *Attorney, Agent, or Firm* — RatnerPrestia

(57) ABSTRACT

A method for activating a function of a motor vehicle upon detecting the presence of a user apparatus in a predetermined detection area around the vehicle. The method includes a step of determining the position of the user apparatus relative to the body of the user; a step of receiving, by the user apparatus, a signal comprising a broadcast message sent by the vehicle; a step of calculating a compensated value of the power of the signal received from the determined position of the user apparatus; a step of estimating the distance separating the user apparatus from the vehicle using the compensated power value, and a step of activating at least one function by the vehicle when the estimated distance is less than a predetermined threshold.

9 Claims, 8 Drawing Sheets

(51) Int. Cl.
*B60R 25/31* (2013.01)
*G07C 9/00* (2020.01)
*H04B 17/318* (2015.01)
*B60R 25/24* (2013.01)

(52) U.S. Cl.
CPC ........... *H04B 17/27* (2015.01); *H04B 17/318* (2015.01); *G07C 2009/00507* (2013.01); *G07C 2209/63* (2013.01)

(56) References Cited

U.S. PATENT DOCUMENTS

2016/0107611 A1* 4/2016 Siswick ................ H04W 4/029
340/425.5
2016/0159321 A1 6/2016 LaGabe

* cited by examiner

METHOD FOR ACTIVATING A FUNCTION OF A MOTOR VEHICLE

CROSS REFERENCE TO RELATED APPLICATIONS

This application is the U.S. National Phase Application of PCT International Application No. PCT/EP2016/001930, filed Nov. 18, 2016, which claims priority of French Application No. FR 1561607, filed Nov. 30, 2015, the contents of such applications being incorporated by reference herein.

FIELD OF THE INVENTION

The present invention relates to the field of motor vehicles and more particularly covers a method for activating a function of a motor vehicle following detection of the presence of user equipment in a predetermined detection zone around said vehicle.

BACKGROUND OF THE INVENTION

Nowadays, certain motor vehicles are able to communicate with equipment carried or worn by the users of these vehicles, such as an electronic ignition key or a smart phone.

Communication between a vehicle and such user equipment makes it possible for example to detect the presence of the user in a predetermined detection zone around the vehicle so as to activate certain functions as the user approaches or moves away from same. By way of example, these functions may be the locking or unlocking of the vehicle interior, or adjustments to equipment such as seats, rearview mirrors, climate control, etc.

In order to detect the presence of user equipment in the detection zone, the vehicle periodically, via an antenna, emits a radio signal containing a message known as the advertising message. When the user equipment receives this signal via its inbuilt antenna, it measures the strength thereof, this being referred to in the known way as RSSI (Received Signal Strength Indication) and communicates this strength value to the vehicle in an emission signal. The vehicle then uses this strength value to estimate the distance at which the user equipment is situated and thus determine whether or not the user is present in the detection zone.

However, it is found that the human body may have a negative impact on the performance of the antenna of the equipment, depending on where it is located in relation to the human body. Specifically, the tissues of the human body may absorb part of the radio signals emitted or received by the antenna of the user equipment, and cause a mismatch in the impedance of the antenna, thus leading to a loss in radiated power in the direction of the body of the user, which may for example be as much as 25 dB.

The antenna of the equipment may be oriented randomly and arbitrarily as it nears the vehicle. However, it is found that, with an antenna radiating pattern that is not omnidirectional, in combination with the impact that the human body has, it becomes absolutely essential to determine not only the position of the equipment in relation to the body of the user, but also the orientation of the user equipment with respect to the vehicle.

The loss of signal strength brought about by the position of the user equipment on the body reduces the RSSI value measured by the user equipment and sent to the vehicle, such that the distance values estimated may be erroneous, thus leading to errors in the detection of the presence of the user in the detection zone, something which therefore represents a major disadvantage.

SUMMARY OF THE INVENTION

An aspect of the invention seeks to at least partially overcome these disadvantages by proposing a simple, reliable and effective solution for reducing the effects of the loss of signal strength of an antenna of a piece of user equipment caused by the body of said user so as to improve the precision with which the presence of the user in the detection zone around a motor vehicle is detected.

To this end, the subject of an aspect of the present invention is a method for activating a function of a motor vehicle following detection of the presence of user equipment in a predetermined detection zone around said vehicle, said method comprising:
 a step of determining the position of the user equipment with respect to the body of the user,
 a step of receiving, via the user equipment, a signal containing an advertising message sent by the vehicle,
 a step of calculating a compensated value for the strength of the signal received, from the determined position of the user equipment,
 a step of estimating the distance separating the user equipment from the vehicle, from the calculated compensated strength value,
 a step of activating at least one function by the vehicle when the estimated distance is below a predetermined threshold.

The method according to an aspect of the invention advantageously makes it possible to compensate for the RSSI value of a signal that is attenuated by the human body according to the position of the user equipment so as to determine precisely the distance separating said user equipment from the vehicle.

According to one aspect of an aspect of the invention, the user equipment comprising at least one inertial sensor, the position of the equipment with respect to the body of the user is determined from a statistical analysis of said inertial sensor. The term "inertial sensors" is to be understood to mean an accelerometer, a gyroscope and/or a magnetometer. The values measured by the inertial sensor constitute a signature of the position of the equipment with respect to the body of the user, which signature can be compared against a set of groups of values each corresponding to a predetermined position of the user equipment with respect to the body of the user.

According to another aspect of the invention, the user equipment comprising at least one gyroscope, the position of the equipment with respect to the body of the user is determined from a sequential analysis of the signal delivered by said gyroscope.

There are a number of conceivable ways in which to embody the method according to an aspect of the invention.

Thus, in a first embodiment, the method comprises steps in which:
 the user equipment first of all determines its position with respect to the body of the user periodically, for example every second,
 the user equipment receives a signal containing an advertising message, sent by the vehicle, for example periodically,
 the user equipment calculates a compensated value for the strength of the signal received, from the determined position of the user equipment, the user equipment estimates the distance separating it from the vehicle, from the calculated compensated strength value, the user equipment then sends this estimated distance value to the vehicle, the vehicle determines whether the user equipment is located in a predetermined detection zone around said vehicle, from the distance value sent by the user equipment, and if it is, the vehicle activates at least one function.

In this first embodiment, the user equipment constantly determines its position so that when it receives an advertising message it can quickly and precisely calculate the compensated value of the signal strength, estimate the distance separating it from the vehicle and send this distance to the vehicle.

In a second embodiment, the method comprises the steps in which:

the user equipment first of all receives a signal containing an advertising message, sent by the vehicle, for example periodically, the user equipment determines its position with respect to the body of the user, the user equipment calculates a compensated value for the strength of the signal received, from the determined position of the user equipment, the user equipment then estimates the distance separating it from the vehicle, from the calculated compensated strength value, the user equipment then sends this estimated distance value to the vehicle, the vehicle determines whether the user equipment is located in a predetermined detection zone around said vehicle, from the distance value sent by the user equipment, and if it is, the vehicle activates at least one function.

In this second embodiment, the user equipment estimates the distance and sends this to the vehicle only when it has received an advertising message, in order to save energy.

In a third embodiment, the method comprises the steps in which:

the user equipment first of all determines its position with respect to the body of the user periodically, for example every second, the user equipment receives a signal containing an advertising message, sent by the vehicle, the user equipment calculates a compensated value for the strength of the signal received, from the determined position of the user equipment, the user equipment estimates the distance separating it from the vehicle, from the calculated compensated strength value, the user equipment determines whether it is located in a predetermined detection zone around said vehicle, from the estimated distance value, and if it is, the user equipment then sends a command message to the vehicle, the vehicle activates at least one function following receipt of said command message.

In this third embodiment, the user equipment constantly determines its position so that when it receives an advertising message it can quickly and precisely calculate the compensated value of the signal strength, estimate the distance separating it from the vehicle and send a command message to the vehicle in order to activate one or more functions.

In a fourth embodiment, the method comprises the steps in which:

the user equipment first of all receives a signal containing an advertising message, sent by the vehicle, the user equipment determines its position with respect to the body of the user and then calculates a compensated value for the strength of the signal received, from the determined position of the user equipment, the user equipment then estimates the distance separating it from the vehicle, from the calculated compensated strength value, the user equipment then determines whether it is located in a predetermined detection zone around said vehicle, from the estimated distance value, if it is, the user equipment sends a command message to the vehicle, and the vehicle activates at least one function following receipt of said command message.

In this fourth embodiment, the user equipment estimates the distance and sends this to the vehicle only when it has received an advertising message, in order to save energy.

In a fifth embodiment, the method comprises the steps in which:

the user equipment first of all receives a signal containing an advertising message, sent by the vehicle, the user equipment sends a confirmation message to the vehicle, indicating that it has correctly received the advertising message, said confirmation message containing information regarding the strength of the signal received from the vehicle by the user equipment and gyroscopic angle and/or acceleration data collected by the user equipment, the vehicle determines the position of the user equipment from the gyroscopic angle and/or acceleration data received, the vehicle calculates a compensated value for the strength of the signal received, from the determined position of the user equipment, and from the information regarding the strength of the signal received from the vehicle by the equipment, the vehicle then estimates the distance separating it from the user equipment, from the calculated compensated strength value, the vehicle then determines whether the user equipment is located in a predetermined detection zone around said vehicle, from the estimated distance value, and if it is, the vehicle activates at least one of its functions.

In this fifth embodiment, the vehicle determines the distance and detects the user equipment, making it possible to simplify the design of the user equipment by comparison with the previous embodiments.

Advantageously, the method comprises a step of detecting a change in position of the user equipment. This step can be carried out constantly in parallel, for example periodically, so as to account for any change in position of the user equipment with respect to the body of the user.

According to one feature of an aspect of the invention, the method comprises a preliminary step of pairing the user equipment and the vehicle.

An aspect of the invention also relates to user equipment allowing activation of at least one function of a motor vehicle following detection of the presence of said user equipment in a predetermined detection zone around said vehicle.

An aspect of the invention also relates to a motor vehicle comprising equipment defining functions, said vehicle being able to activate at least one of its functions following detection of the presence of user equipment in a predetermined detection zone around said vehicle.

In a first embodiment, the user equipment comprises:
a module for determining its position with respect to the body of the user,
a module for receiving a signal containing an advertising message, sent by the vehicle,
a module for calculating a compensated value for the strength of the signal received, from the determined position of the user equipment,
a module for estimating the distance separating it from the vehicle, from the calculated compensated strength value.

Advantageously, the user equipment may further comprise a module for sending an estimated distance value to the vehicle.

In a first associated embodiment, the vehicle comprises:
a module for receiving a distance value sent by the user equipment,
a module for determining the presence of the user equipment in a predetermined detection zone around said vehicle, from the distance value received, and
a module for activating at least one function of the vehicle.

In a second embodiment, the user equipment comprises a module for determining its presence in a predetermined detection zone around said vehicle from the estimated distance value, and a module for sending a command message to the vehicle so that the latter will activate at least one of its functions.

In a second associated embodiment, the vehicle comprises:
a module for receiving a command message, and
a module for activating a function following receipt of said command message.

In a third embodiment, the user equipment comprises:
a module for receiving a signal containing an advertising message, sent by the vehicle,
a measurement model configured to measure the strength of a signal received by the receiving module and for taking measurements of the accelerations of the user equipment,
a module for sending a confirmation message to the vehicle, indicating that it has correctly received the advertising message, said confirmation message containing a value for the strength measured by the measurement module and acceleration measurements collected by the measurement module.

In a third associated embodiment, the motor vehicle comprises:
a module for sending a signal containing an advertising message,
a module for receiving a confirmation message, sent by the user equipment, said confirmation message containing a value for the strength measured by the user equipment and gyroscopic angle and/or acceleration measurements collected by the user equipment,
a module for determining the position of the user equipment from the gyroscopic angle and/or acceleration measurements received,
a model for calculating a compensated value for the strength of the signal received, from the determined position of the user equipment, and from the information regarding the strength of the signal received from the vehicle by the equipment,
a module for estimating the distance separating it from the user equipment, from the calculated compensated strength value,
a module for determining the presence of the user equipment in a predetermined detection zone around said vehicle, from the estimated distance value, and
a module for activating at least one function of the vehicle.

BRIEF DESCRIPTION OF THE DRAWINGS

Other features and advantages of aspects of the invention will emerge during the following description given with reference to the appended figures, which are given by way of nonlimiting example and in which identical references are given to similar objects.

DETAILED DESCRIPTION OF THE PREFERRED EMBODIMENTS

The system according to an aspect of the invention comprises a motor vehicle, a user of said vehicle, and an item of user equipment. The vehicle comprises a plurality of equipment items and an antenna.

This plurality of equipment items may comprise adjustable seats, adjustable rear view mirrors, a climate control system, etc. and defines a plurality of functions such as, respectively, the seat adjustments, the adjustments of the rearview mirrors or of the climate control system, or alternatively still, the locking or unlocking of access to the vehicle interior.

The vehicle antenna is configured to emit signals containing advertising messages and to receive signals sent by the user equipment, comprising, for example, an RSSI value or a command message for activating one or more functions of the vehicle.

Likewise, the user equipment comprises an antenna configured both to receive signals containing advertising messages sent by the vehicle, and to emit signals containing for example, an RSSI value or a command message for activating one or more functions of the vehicle.

Figure 1:
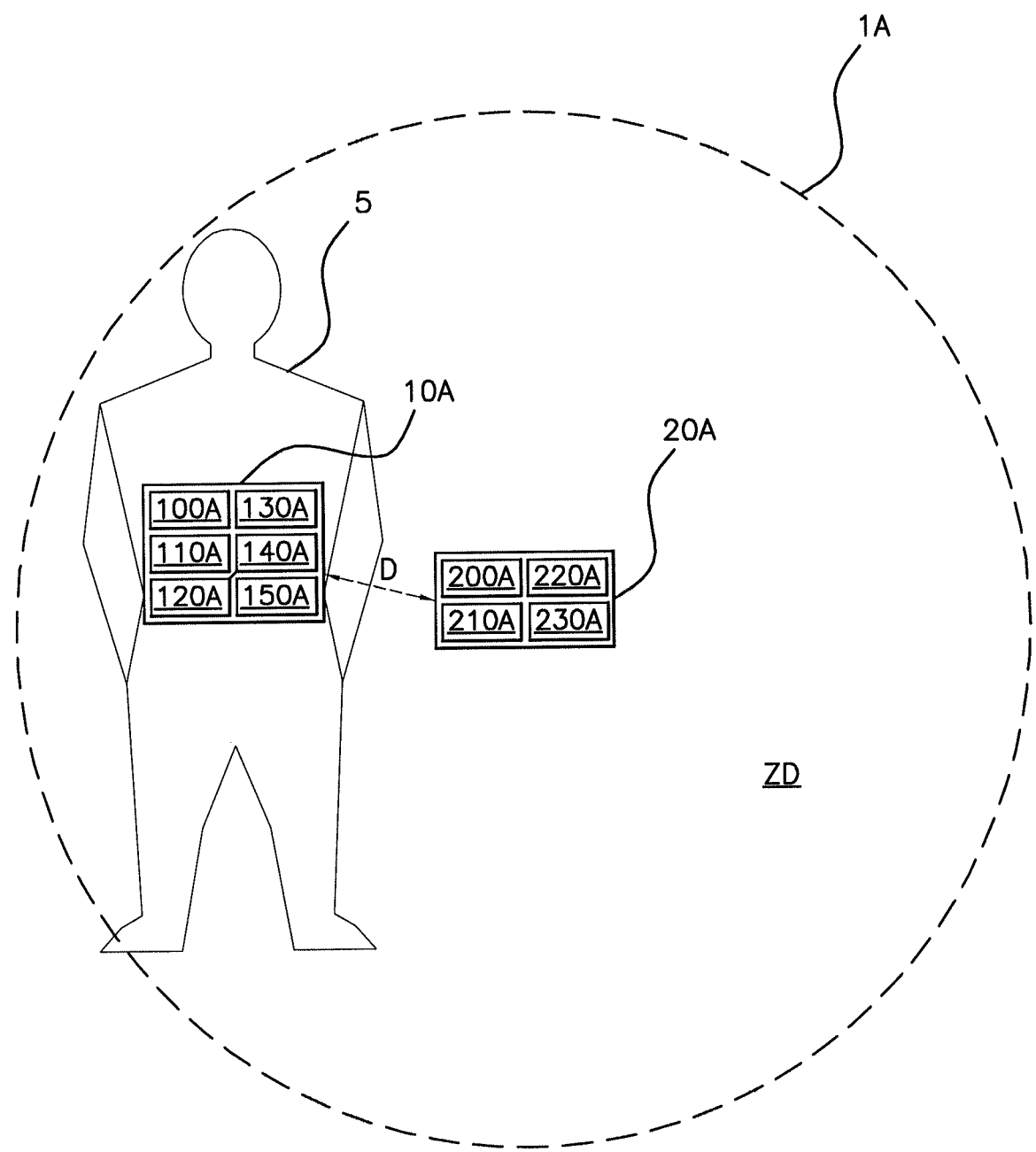
FIG. 1 schematically illustrates a first embodiment of the system according to an aspect of the invention.

In a first embodiment of the system 1A according to an aspect of the invention, illustrated in FIG. 1, the user equipment 10A comprises a position-determining module 100A, a receiving module 110A, a measurement module 120A, a calculation module 130A, an estimating module 140A and a sending module 150A.

The position-determining module 100A is configured for determining the position of the user equipment 10A with respect to the body of the user 5. Two examples of a position-determining module 100A will be presented.

In a first example, the user equipment 10A comprises at least one inertial sensor of accelerometer type which makes it possible to determine a signature of the position of the user equipment 10A in the three dimensions of space, as described hereinafter. By way of example, a 3-D accelerometer may be set to a specific sampling value, for example to a period of 20 ms, in order to identify the axis of orientation of the user equipment 10A by detecting the gravity (of the order of 9.8 m/s$^2$) on one of the three axes, or by combining them. In other words, the orientation of the user equipment 10A is determined by summing the axes X, Y or Z along which the accelerometer is predominantly experiencing the effect of gravity. The use of all three axes of the determined accelerometer allows for better precision regarding the orientation of the user equipment 10A. Orientation may be detected when the user is static, namely when he is not moving, but can also be detected dynamically, when he is in motion. When the user 5 is in motion, for example walking, the body naturally and periodically, on each of its limbs (for example arms, legs or even trunk), generates characteristic movements which can be identified as being signatures specific to each position. The accelerometer is thus used to scrutinize the movements of the limb on which the user equipment 10A is positioned. In order to do this, the determination module 100A collects the information supplied by the three axes of the accelerometer and performs a statistical analysis of the results such as, for example, by calculating the mean value, the minimum value, the maximum value, the standard deviation, the variance, the asymmetry, the kurtosis and the median. By way of example, the combination of 4 parameters listed hereinabove (namely the minimum, the maximum, the standard deviation and the mean value) makes it possible to identify 30 different positions of the equipment 10A on the user 5.

In a second example, the user equipment comprises an inertial sensor of accelerometer type and an inertial sensor of gyroscope type, which make it possible to determine a signature of the position of the user equipment 10A in the three dimensions of space, as described hereinafter. The 3-D accelerometer may be set to a specific sampling value, for example to a period of 20 ms, used to identify the axis of orientation of the user equipment 10A by detecting the gravity (of the order of 9.8 m/s$^2$) on one of the three axes. In other words, the orientation of the user equipment 10A is determined by summing the axes X, Y or Z along which the accelerometer is predominantly experiencing the effect of gravity. The use of all three axes of the accelerometer allows for better precision regarding the orientation of the user equipment 10A. Orientation may be detected when the user is static, namely when he is not moving, but can also be detected dynamically, when he is in motion. When the user 5 is in motion, for example walking, the body naturally and periodically, on each of its limbs (for example arms, legs or even trunk), generates characteristic angular movements, of a rocking type which can be identified as being signatures specific to each position. The gyroscope is thus used to determine one or more gyroscopic angles. In order to do this, use is made of the gyroscope axis that is perpendicular to the accelerometer axis predominantly affected by gravity. Analysis of the data from this gyroscope axis makes it possible to determine at least one gyroscopic angle according to the position of the user equipment 10A. Determining a minimum gyroscopic angle and a maximum gyroscopic angle that alternate periodically makes it possible to deduce that the user is in motion, for example walking. In other words, when the user is walking and the equipment 10A is positioned on one of his limbs, such as in a hand or on a thigh, the associated position can be detected by measuring the time between each passage of the gyroscopic angle through zero. This in other words makes it possible to determine not only the position of the user equipment but also how the user is behaving, namely whether he is walking slowly, walking quickly, or even running. Determining a gyroscopic angle of zero with respect to the vertical notably makes it possible to determine that the user is in an upright position, whereas determining a gyroscopic angle that is constant and above a predetermined threshold angle corresponds to a user in a sitting position. The position of the equipment 10A with respect to the body of the user 5, namely in front of him (for example in a jacket pocket), on his side (for example in a bag carried in the user's hand) or behind him (for example in a trouser back pocket).

Using these two means, the position-determining module 100A uses each set of gyroscopic angle(s) and/or acceleration values, referred to as a signature, to compare against RF signal attenuation parameters connected with the detected position of the user equipment 10A in order to correct the measured RSSI value. These attenuation parameters are, for example, stored beforehand in a memory zone of the user equipment 10A and each corresponding to a predetermined position with respect to the body of the user 5. When a signature is determined, the associated position is validated. This scrutiny is performed in real time, making it possible to detect a change from a first position to a second position. The second position is detected after the user equipment 10A has become stabilized on the user.

Because of this a new corrective value is applied to the RSSI value measured, by the calculation module 130A, making it possible to obtain a post-correction RSSI value that is the same whatever the position of the user equipment 10A, or in other words making it possible to take away the influence that the body has on the RSSI value returned during the distance calculation by the module 140A. During the transition phase, namely the time between non-detections of the first position and of the second position, the correction of the RSSI value is no longer performed, nor is it sent by the user equipment 10A.

The receiving module 110A is configured for receiving a signal containing an advertising message, sent by the vehicle 20A.

The measurement module 120A is configured for measuring the strength of a received signal, sent by the vehicle 20A.

The calculation module 130A is configured for calculating a compensated value for the strength of the signal received, from the determined position of the user equipment 10A. This compensated value can be calculated from a lookup table (not depicted) containing compensation values to be added to the strength measured by the measurement module 100A according to the position of the equipment 10A with respect to the body of the user 5. This lookup table may advantageously be stored in the user equipment 10A. In other words, each position of the equipment 10A with respect to the body of the user 5 corresponds to a signal strength compensation value determined for example in advance, by empirical methods.

The estimation module 140A is configured for estimating the distance D separating the user equipment 10A from the vehicle 20A, from the calculated compensated strength value.

The sending module 150A is configured for sending an estimated distance value D to the vehicle 20A.

In this first embodiment, the vehicle 20A comprises a sending module 200A, a receiving module 210A, a presence-determining module 220A and an activation module 230A.

The sending module 200A is configured for broadcasting signals containing a broadcast message known as an "advertising" message.

The receiving module 210A is configured for receiving a distance value D sent by the user equipment 10A.

The presence-determining module 220A is configured for determining the presence of the user equipment 10A in a predetermined detection zone ZD around said vehicle 20A, from the distance value D received.

The activation module 230A is configured for activating at least one function of the vehicle 20A, once the user equipment 10A has been detected in the predetermined detection zone ZD around the vehicle 20A.

Figure 2:
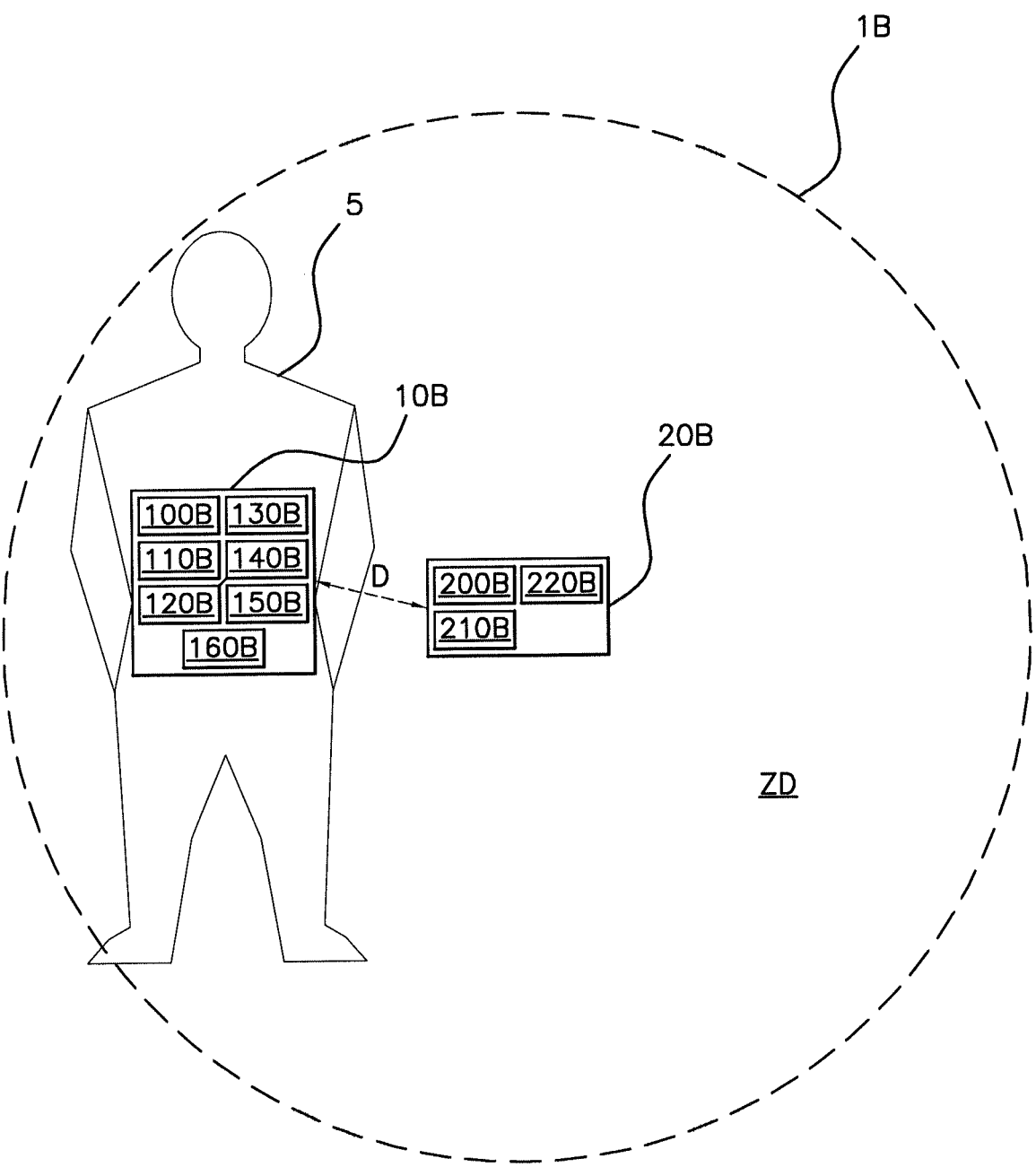
FIG. 2 schematically illustrates a second embodiment of the system according to an aspect of the invention.

In a second embodiment of the system 1B, illustrated in FIG. 2, the user equipment 10B comprises a position-determining module 100B, a receiving module 110B, a measurement module 120B, a calculation module 130B, an estimating module 140A, a presence-determining module 150B and a sending module 160B.

The position-determining module 100B is configured for determining the position of the user equipment 10B with respect to the body of the user 5. Two examples of a position-determining module 100B will be described.

In a first example, the user equipment 10B is made up of at least one inertial sensor of accelerometer type which makes it possible to determine a signature of the position of the user equipment 10B in the three dimensions of space, as described hereinafter. By way of example, a 3-D accelerometer may be set to a specific sampling value, for example to a period of 20 ms, used to identify the axis of orientation of the user equipment 10B by detecting the gravity (of the order of 9.8 m/s$^2$) on one of the three axes, or by combining them. In other words, the orientation of the user equipment 10B is determined by summing the axes X, Y or Z along which the accelerometer is predominantly experiencing the effect of gravity. The use of all three axes of the determined accelerometer allows for better precision regarding the orientation of the user equipment 10B. Orientation may be detected when the user is static, namely when he is not moving, but can also be detected dynamically, when he is in motion. When the user 5 is in motion, for example walking, the body naturally and periodically, on each of its limbs (for example arms, legs or even trunk), generates characteristic movements which can be identified as being signatures specific to each position. The accelerometer is thus used to scrutinize the movements of the limb on which the user equipment 10B is positioned. In order to do this, the determination module 100B collects the information supplied by the 3 axes of the accelerometer and performs a statistical analysis of the results such as by calculating the mean value, the minimum value, the maximum value, the standard deviation, the variance, the asymmetry, the kurtosis and the median. By way of example, the combination of 4 parameters listed hereinabove (namely the minimum, the maximum, the standard deviation and the mean) makes it possible to identify 30 different positions of the equipment 10B on the user 5.

In a second example, the user equipment is made up of an inertial sensor of accelerometer type and of an inertial sensor of gyroscope type, which make it possible to determine a signature of the position of the user equipment 10B in the three dimensions of space, as described hereinafter. By way of example, a 3-D accelerometer may be set to a specific sampling value, for example to a period of 20 ms, used to identify the axis of orientation of the user equipment 10B by detecting the gravity (of the order of 9.8 m/s$^2$) on one of the three axes. In other words, the orientation of the user equipment 10B is determined by summing the axes X, Y or Z along which the accelerometer is predominantly experiencing the effect of gravity. The use of all three axes of the accelerometer allows for better precision regarding the orientation of the user equipment 10B. Orientation may be detected when the user is static, namely when he is not moving, but can also be detected dynamically, when he is in motion. When the user 5 is in motion, for example walking, the body naturally and periodically, on each of its limbs (for example arms, legs or even trunk), generates characteristic angular movements, of a rocking type which can be identified as being signatures specific to each position. The gyroscope is thus used to determine one or more gyroscopic angles. In order to do this, use is made of the gyroscope axis that is perpendicular to the accelerometer axis predominantly affected by gravity. Analysis of the data from this gyroscope axis makes it possible to determine at least one gyroscopic angle according to the position of the user equipment 10B. Determining a minimum gyroscopic angle and a maximum gyroscopic angle that alternate periodically makes it possible to deduce that the user is in motion, for example walking. In other words, when the user is walking and the equipment 10B is positioned on one of his limbs, such as in a hand or on a thigh, the associated position can be detected by measuring the time between each passage of the gyroscopic angle through zero. This in other words makes it possible to determine not only the position of the user equipment but also how the user is behaving, namely whether he is walking slowly, walking quickly, or even running. Determining a gyroscopic angle of zero with respect to the vertical notably makes it possible to determine that the user is in an upright position, whereas determining a gyroscopic angle that is constant and above a predetermined threshold angle corresponds to a user in a sitting position. The position of the equipment 10B with respect to the body of the user 5, namely in front of him (for example in a jacket pocket), on his side (for example in a bag carried in the user's hand) or behind him (for example in a trouser back pocket).

Using these two means, the position-determining module 100B uses each set of gyroscopic angle(s) and/or acceleration values, referred to as a signature, to compare against RF signal attenuation parameters connected with the detected position of the user equipment 10B in order to correct the measured RSSI value. These attenuation parameters are, for example, stored beforehand in a memory zone of the user equipment 10B and each corresponding to a predetermined position with respect to the body of the user 5. When a signature is determined, the associated position is validated. This scrutiny is performed in real time, making it possible to detect a change from a first position to a second position. The second position is detected after the user equipment 10B has become stabilized on the user.

Because of this a new corrective value is applied to the RSSI value measured, by the calculation module 130B, making it possible to obtain a post-correction RSSI value that is the same whatever the position of the user equipment 10B, or in other words making it possible to take away the influence that the body has on the RSSI value returned during the distance calculation by the module 140B. During the transition phase, namely the time between non-detections of the first position and of the second position, the correction of the RSSI value is no longer performed, nor is it sent by the user equipment 10B.

The receiving module 110B is configured for receiving, from the vehicle 20B, a signal containing an advertising message.

The measurement module 120B is configured for measuring the strength (for example the RSSI) of a signal received by the receiving module 110B.

The calculation module 130B is configured for calculating a compensated value for the strength of the signal received, from the determined position of the user equipment 10B. Just as in the first embodiment, this compensated value can be calculated from a lookup table (not depicted) containing compensation values to be added to the strength measured by the measurement module 100B according to the spatial orientation of the equipment 10B with respect to the body of the user 5. This lookup table may advantageously be stored in the user equipment 10B.

The estimation module 140B is configured for estimating the distance D separating the user equipment 10B from the vehicle 20B, from the calculated compensated strength value.

The presence-determining module 150B is configured for determining the presence of the user equipment 10B in a predetermined detection zone ZD around the vehicle 20B, from the estimated distance value D.

The sending module 1608 is configured for sending a command message to the vehicle 20B so that the latter will activate at least one of its functions.

In this second embodiment, the vehicle 20B comprises a sending module 200B, a receiving module 210B, and an activation module 220B.

The sending module 200B is configured for broadcasting an "advertising" message.

The receiving module 210B is configured for receiving a command message sent by the user equipment 10B.

The activation module 220B is configured for activating a function of the vehicle 20B following receipt of said command message.

Figure 3:
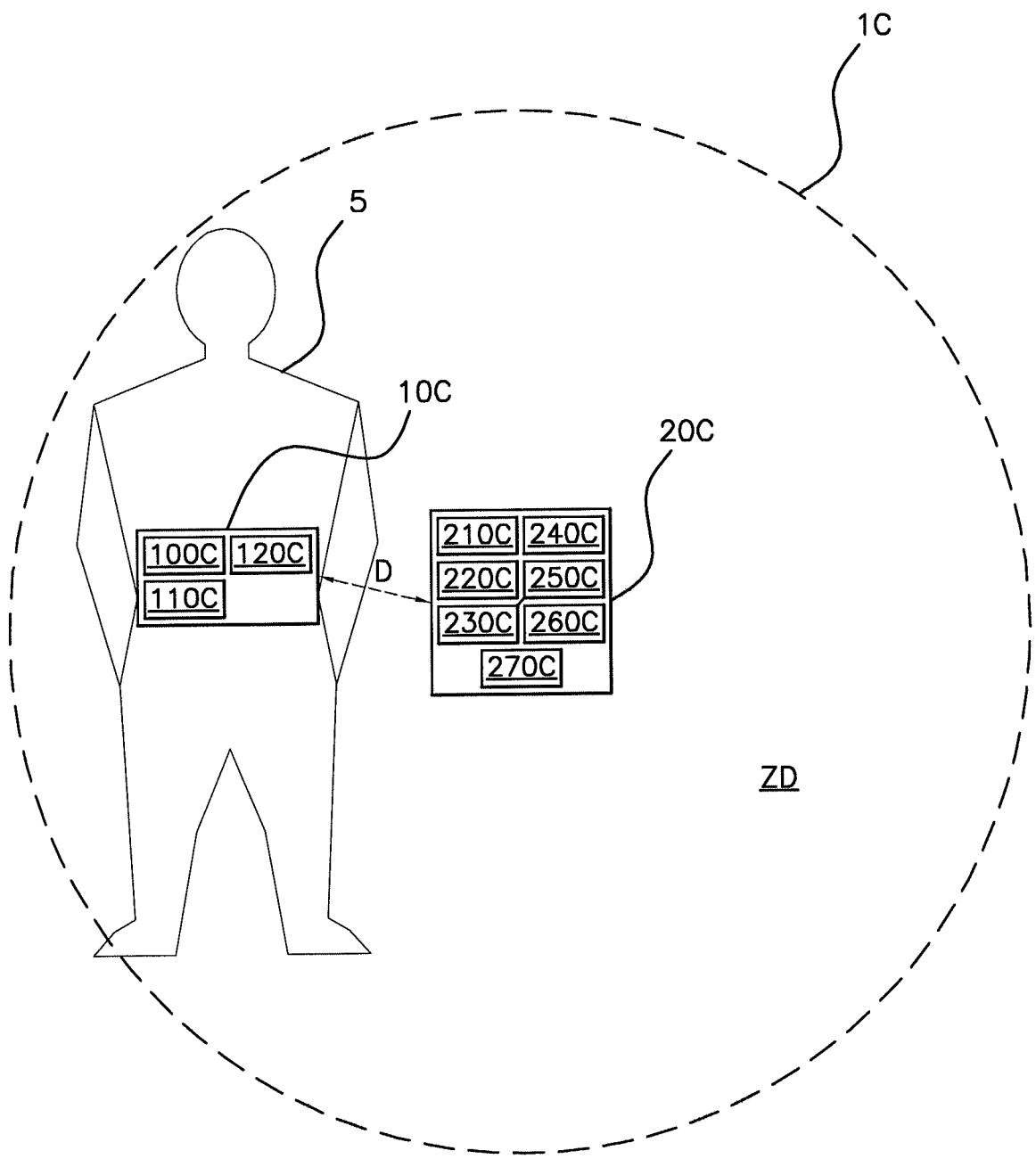
FIG. 3 schematically illustrates a third embodiment of the system according to an aspect of the invention.

In a third embodiment of the system 1C, illustrated in FIG. 3, the user equipment 10C comprises a receiving module 100C, a measurement module 110C, and a sending module 120C.

The receiving module 100C is configured for receiving a signal, sent by the vehicle 20C, containing an advertising message.

The measurement module 110C is configured for measuring the strength of a signal received by the receiving module 100C and for taking gyroscopic angle and/or acceleration measurements. For that purpose, the user equipment 10C may comprise at least one accelerometer and one gyroscope which will make it possible to determine a signature of the position of the user equipment 10C in the three dimensions of space, as described hereinafter. By way of example, a 3-D accelerometer may be used to identify the axis of orientation of the user equipment 10C by detecting the gravity (of the order of 10 m/s$^2$) on one of the three axes. In other words, the orientation of the user equipment 10C is determined by identifying the axis X, Y or Z along which the accelerometer is predominantly experiencing the effect of gravity. The use of the determined accelerometer axis alone does not allow for a precise calculation of the corresponding angle, because the acceleration generated by the user in motion will combine with the natural acceleration due to gravity; now, extracting this effect due to gravity and compensating for it would involve excessively lengthy calculation and reaction times. A gyroscope is thus used to determine one or more gyroscopic angles. In order to do this, use is made of the gyroscope axis that corresponds to the accelerometer axis determined by gravity. Integration of this gyroscope axis makes it possible to determine at least one gyroscopic angle according to the position of the user equipment 10C. Determining a minimum gyroscopic angle and a maximum gyroscopic angle that alternate periodically makes it possible to deduce that the user is walking. In other words, when the user is walking and the equipment 10C is positioned on one of his limbs, such as in a hand or on a thigh, the associated position can be detected by measuring the time between each passage of the gyroscopic angle through zero. Determining a gyroscopic angle of zero with respect to the vertical notably makes it possible to determine that the user is in an upright position, whereas determining a gyroscopic angle that is constant and above a predetermined threshold angle corresponds to a user in a sitting position.

The sending module 120C is configured for sending a confirmation message to the vehicle 20C, indicating that it has indeed received the advertising message. This confirmation message contains information regarding the strength of the signal received from the vehicle 20C by the user equipment 10C (the RSSI) measured at a given moment as well as gyroscopic angle and/or acceleration data collected by the user equipment 10C at the same given moment.

In this third embodiment, the vehicle 20C comprises a sending module 210C, a receiving module 220C, a position-determining module 230C, a calculation module 240C, an estimation module 250C, a presence-determining module 260C and an activation module 270C.

The sending module 200A is configured for broadcasting signals containing an "advertising" message.

The receiving module 220C is configured for receiving a confirmation message sent by the user equipment. This confirmation message contains information regarding the strength of the signal received from the vehicle by the user equipment (the RSSI) at a given moment as well as gyroscopic angle and/or acceleration data collected by the user equipment 10C at the same moment.

The position-determining module 230C is configured for determining the position of the user equipment 10C from the gyroscopic angle and acceleration data received from the user equipment 10C.

By way of example, a 3-D accelerometer that may be set to a specific sampling value, for example to a period of 20 ms, used to identify the axis of orientation of the user equipment 10C by detecting the gravity (of the order of 9.8 m/s$^2$) on one of the three axes, or by combining them. In other words, the orientation of the user equipment 10C is determined by summing the axes X, Y or Z along which the accelerometer is predominantly experiencing the effect of gravity. The use of all three axes of the determined accelerometer allows for better precision regarding the orientation of the user equipment 10C. Orientation may be detected when the user is static, namely when he is not moving, but can also be detected dynamically, when he is in motion. When the user 5 is in motion, for example walking, the body naturally and periodically, on each of its limbs (for example arms, legs or even trunk), generates characteristic movements which can be identified as being signatures specific to each position. The accelerometer is thus used to scrutinize the movements of the limb on which the user equipment 10C is positioned. In order to do this, the determination module 230C collects the information supplied by the 3 axes of the accelerometer and performs a statistical analysis of the results such as by calculating the mean value, the minimum value, the maximum value, the standard deviation, the variance, the asymmetry, the kurtosis and the median. By way of example, the combination of 4 parameters listed hereinabove (namely the minimum, the maximum, the standard deviation and the mean) makes it possible to identify 30 different positions of the equipment 10C on the user 5.

In a second embodiment, the user equipment is made up of an accelerometer and of a gyroscope, which will make it possible to determine a signature of the position of the user equipment 10A in the three dimensions of space, as described hereinafter. By way of example, a 3-D accelerometer may be set to a specific sampling value, for example to a period of 20 ms, used to identify the axis of orientation of the user equipment 10C by detecting the gravity (of the order of 9.8 m/s$^2$) on one of the three axes. In other words, the orientation of the user equipment 10C is determined by summing the axes X, Y or Z along which the accelerometer is predominantly experiencing the effect of gravity. The use of all three axes of the determined accelerometer allows for better precision regarding the orientation of the user equipment 10C. Orientation may be detected when the user is static, namely when he is not moving, but can also be detected dynamically, when he is in motion. When the user 5 is in motion, for example walking, the body naturally and periodically, on each of its limbs (for example arms, legs or even trunk), generates characteristic angular movements, of a rocking type which can be identified as being signatures specific to each position. The gyroscope is thus used to determine one or more gyroscopic angles. In order to do this, use is made of the gyroscope axis that is perpendicular to the accelerometer axis predominantly affected by gravity. Analysis of the data from this gyroscope axis makes it possible to determine at least one gyroscopic angle according to the position of the user equipment 10C. Determining a minimum gyroscopic angle and a maximum gyroscopic angle that alternate periodically makes it possible to deduce that the user is in motion, for example walking. In other words, when the user is walking and the equipment 10C is positioned on one of his limbs, such as in a hand or on a thigh, the associated position can be detected by measuring the time between each passage of the gyroscopic angle through zero. This in other words makes it possible to determine not only the position of the user equipment but also how the user is behaving, namely whether he is walking slowly, walking quickly, or even running. Determining a gyroscopic angle of zero with respect to the vertical notably makes it possible to determine that the user is in an upright position, whereas determining a gyroscopic angle that is constant and above a predetermined threshold angle corresponds to a user in a sitting position. The position of the equipment 10C with respect to the body of the user 5, namely in front of him (for example in a jacket pocket), on his side (for example in a bag carried in the user's hand) or behind him (for example in a trouser back pocket).

Using these two means, the position-determining module 230C uses each set of gyroscopic angle(s) and/or acceleration values, referred to as a signature, to compare against RF signal attenuation parameters connected with the detected position of the user equipment 10C in order to correct the measured RSSI value. These attenuation parameters are, for example, stored beforehand in a memory zone of the user equipment 10C and each corresponding to a predetermined position with respect to the body of the user 5. When a signature is determined, the associated position is validated. This scrutiny is performed in real time, making it possible to detect a change from a first position to a second position. The second position is detected after the user equipment 10C has become stabilized on the user.

Because of this a new corrective value is applied to the RSSI value measured, by the calculation module 130A, making it possible to obtain a post-correction RSSI value that is the same whatever the position of the user equipment 10C, or in other words making it possible to take away the influence that the body has on the RSSI value returned during the distance calculation by the module 250C.

The calculation module 240C is configured for calculating or determining (for example from a predetermined lookup table) a compensated value for the strength of the signal received, from the determined position of the user equipment 10C, particularly using the information regarding the strength of the signal received from the vehicle 20C by the equipment 10C.

The estimation module 250C is configured for estimating the distance separating it from the user equipment 10C, from the calculated compensated strength value.

The presence-determining module 260C is configured for determining the presence of the user equipment 10C in a predetermined detection zone ZD around the vehicle 20C, from the estimated distance value.

The activation module 270C is configured for activating at least one function of the vehicle 10C.

The method according to an aspect of the invention allows activation of at least one function of a motor vehicle 20A, 20B, 20C following detection of the presence of user equipment 10A, 10B, 10C in a predetermined detection zone ZD around said vehicle 20A, 20B, 20C.

The function activated may, for example, consist in locking access to the interior (not depicted) of the vehicle 20A, 20B, 20C, or alternatively adjusting an item of equipment (not depicted) of the vehicle 20A, 20B, 20C, such as the seats, the climate control, the rearview mirrors, etc.

In a preliminary step E0 (not depicted in FIGS. 4 to 8) that is common to all five embodiments described hereinafter, the user equipment 10A, 10B, 10C and the vehicle 20A, 20B, 20C carry out a pairing operation.

The pairing between the user equipment 10A, 10B, 10C and the vehicle 20A, 20B, 20C occurs at the time of first connection. The exchanging of their identities allows controlled access to the vehicle 20A, 20B, 20C so that the latter can recognize the user equipment 10A, 10B, 10C. This connection is achieved through the exchange of a security code. The user equipment 10A, 10B or 10C sends a request to the vehicle 20A, 20B, 20C, which replies to it. These exchanges may be performed by wireless communication of the Wi-Fi or Bluetooth® type, namely using technology of the BLE or NFC type which makes it possible to increase the security of the system against hacking, because the range is shorter and the exchange protocol is more robust to attack.

Figure 4:
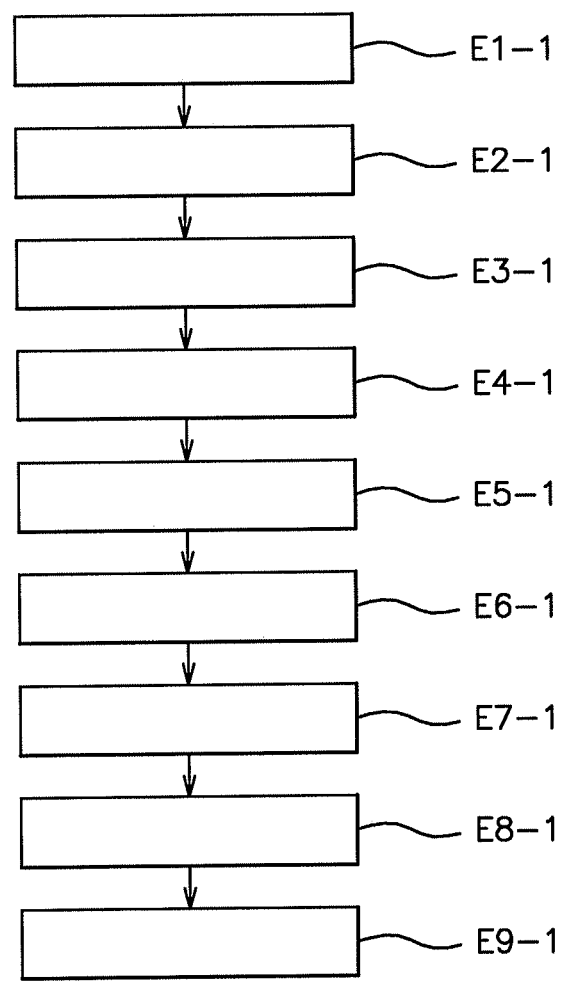
FIG. 4 is a flow diagram of a first embodiment of the method according to an aspect of the invention.

This first embodiment, illustrated in FIG. 4, is implemented by the first form of embodiment of the system 1A described hereinabove.

In a step E1-1, the position-determining module 100A of the user equipment, 10A first of all, periodically, determines the position of the user equipment 10A with respect to the body of the user 5. The position-determining period may be defined by the real-time sampling period of the accelerometer of the user equipment 10A, for example a few milliseconds, or a few tens of milliseconds, advantageously 10 ms.

When it lies within the radio coverage of the antenna of the vehicle 20A, the receiving module 110A of the user equipment 10A receives, in a step E2-1, a signal containing an advertising message, emitted periodically by the sending module 200A of the vehicle 20A.

In a step E3-1, the measurement module 120A of the user equipment 10A measures the strength of the signal received and the calculation module 130A of the user equipment 10A calculates, in a step E4-1, a (theoretical) compensated value for the measured strength, from the determined position of the user equipment 10A. This compensated value corresponds to the true value of the strength of the signal received increased by an amount that compensates for the signal power absorbed by the body of the user 5 according to the position, namely to the orientation, of the user equipment 10A.

The estimation module 140A of the user equipment 10A then, in a step E5-1, estimates the distance D separating it from the vehicle 20A, from the compensated strength value calculated by the calculation module 130A.

The sending module 150A of the user equipment 10A then, in a step E6-1, sends this distance value D to the vehicle 20A in a signal.

The receiving module 210A of the vehicle 20A then, in a step E7-1, receives this distance value D and transmits it to the determining module 220A which, from this distance value D, in a step E8-1, determines whether the user equipment 10A is located in the predetermined detection zone ZD around said vehicle 20A.

If it is, the activation module 230A activates one or more of the functions of the vehicle 20A in a step E9-1.

Figure 5:
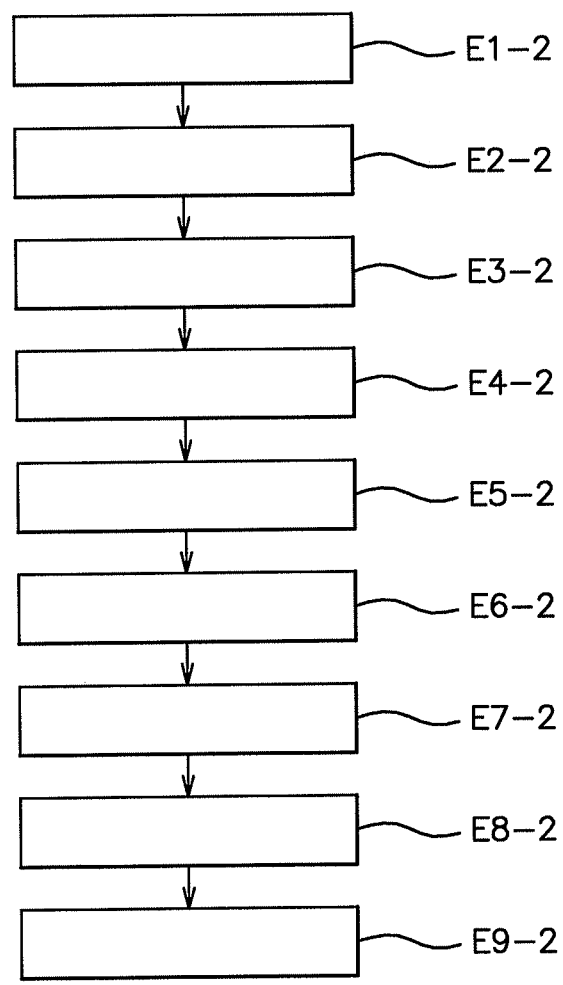
FIG. 5 is a flow diagram of a second embodiment of the method according to an aspect of the invention.

This second embodiment, illustrated in FIG. 5, is also implemented by the first form of embodiment of the system 1A described hereinabove.

When it lies within the radio coverage of the antenna of the vehicle 20A, the receiving module 110A of the user equipment 10A receives, in a step E1-2, a signal containing an advertising message, emitted periodically by the sending module 200A of the vehicle 20A.

In a step E2-2, the measurement module 120A of the user equipment 10A measures the strength of the signal received.

Once it has received this advertising message, the position-determining module 100A of the user equipment 10A determines, in a step E3-2, the position of the user equipment 10A with respect to the body of the user 5.

The calculation module 130A then, in a step E4-2, calculates a (theoretical) compensated value for the strength of the signal received, from the determined position of the user equipment 10A. This compensated value corresponds to the true value of the strength of the signal received increased by an amount that compensates for the signal power absorbed by the body of the user 5 according to the position, namely to the orientation, of the user equipment 10A.

The estimation module 140A of the user equipment 10A then, in a step E5-2, estimates the distance D separating it from the vehicle 20A, from the calculated compensated strength value.

The sending module 150A of the user equipment 10A then sends this estimated distance value D to the vehicle 20A, in a step E6-2.

The receiving module 210A of the vehicle 20A, in a step E7-2, receives this distance value D and transmits it to the determining module 220A which, from this distance value D, in a step E8-2, determines whether the user equipment 10A is located in the predetermined detection zone ZD around said vehicle 20A. If it is, the activation module 230A activates one or more of the functions of the vehicle 20A in a step E9-2.

Figure 6:
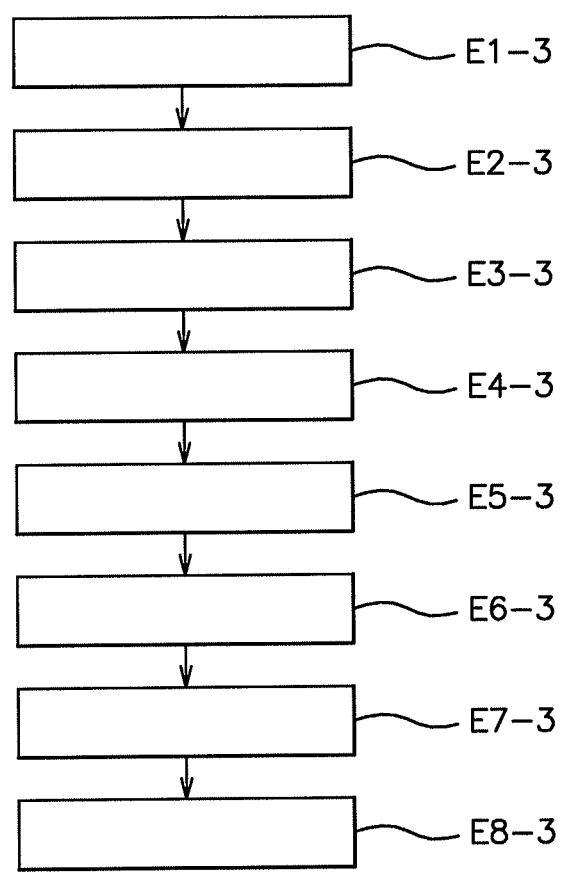
FIG. 6 is a flow diagram of a third embodiment of the method according to an aspect of the invention.

This third embodiment, illustrated in FIG. 6, is implemented by the second form of embodiment of the system 1B described hereinabove.

In this third embodiment, the position-determining module 100B periodically determines, in a step E3-1, its position with respect to the body of the user 5. The position-determining period may be defined by the real-time sampling period of the accelerometer of the user equipment 10A, for example a few milliseconds, or a few tens of milliseconds, advantageously 10 ms.

The receiving module 110B of the user equipment 10B receives, in a step E2-3, a signal containing an advertising message, emitted periodically by the sending module 200B of the vehicle 20B.

The measurement module 120B of the user equipment 10B then, in a step E3-3, measures the strength of the signal received.

In a step E4-3, the calculation module 130B of the user equipment 10B calculates a (theoretical) compensated value for the strength of the signal received, from the determined position of the user equipment 10B. This compensated value corresponds to the true value of the strength of the signal received increased by an amount that compensates for the signal power absorbed by the body of the user 5 according to the position, namely to the orientation, of the user equipment 10B.

The estimation module 140B of the user equipment 10B then, in a step E5-3, estimates the distance D separating it from the vehicle 20B, from the calculated compensated strength value.

The presence-determining module 150B of the user equipment 10B then, in a step E6-3, determines whether it is located in the predetermined detection zone ZD around the vehicle 20B, from the distance value D sent by the user equipment 10B.

If it is, the sending module 160B of the user equipment 10B, in a step E7-3, sends a command message to the receiving module 210B of the vehicle 20B so that the activation module 220B of the vehicle 20B, in a step E8-3, activates a function following receipt of said command message.

Figure 7:
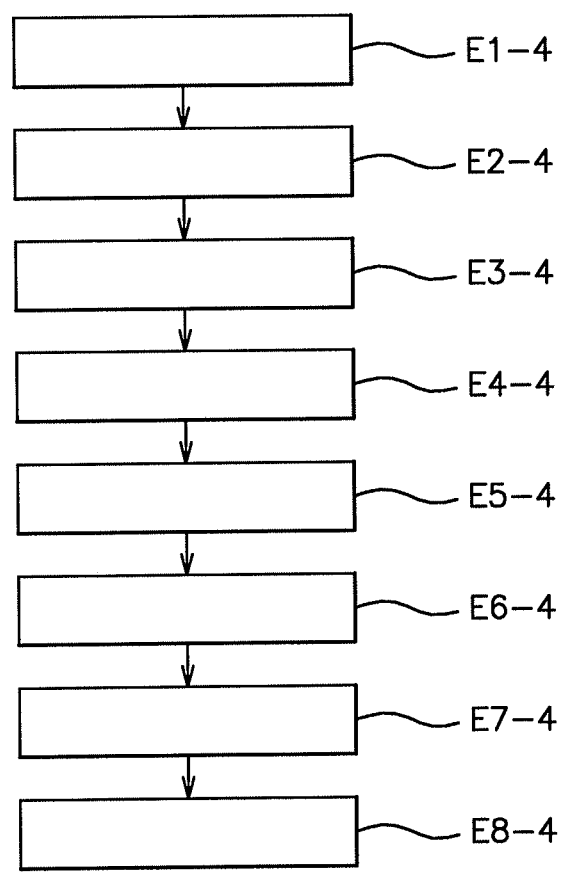
FIG. 7 is a flow diagram of a fourth embodiment of the method according to an aspect of the invention.

This fourth embodiment, illustrated in FIG. 7, is implemented by the second form of embodiment of the system 1B described hereinabove.

In this fourth embodiment, the receiving module 110B of the user equipment 10B first of all, in a step E1-4, receives a signal containing an advertising message, emitted periodically by the sending module 200B of the vehicle 20B.

The measurement module 120B of the user equipment 10B then, in a step E2-4, measures the strength of the signal received.

The position-determining module 100B then, in a step E3-4, determines its position with respect to the body of the user 5.

In a step E4-4, the calculation module 130B of the user equipment 10B calculates a (theoretical) compensated value for the strength of the signal received, from the determined position of the user equipment 10B. This compensated value corresponds to the true value of the strength of the signal received increased by an amount that compensates for the signal power absorbed by the body of the user 5 according to the position, namely to the orientation, of the user equipment 10B.

The estimation module 140B of the user equipment 10B then, in a step E5-4, estimates the distance D separating it from the vehicle 20B, from the calculated compensated strength value.

The presence-determining module 150B of the user equipment 10B then, in a step E6-4, determines whether it is located in the predetermined detection zone ZD around the vehicle 20B, from the distance value D sent by the user equipment 10B.

If it is, the sending module 160B of the user equipment 10B, in a step E7-4, sends a command message to the receiving module 210B of the vehicle 20B so that the activation module 220B of the vehicle 20B, in a step E8-4, activates a function following receipt of said command message.

Figure 8:
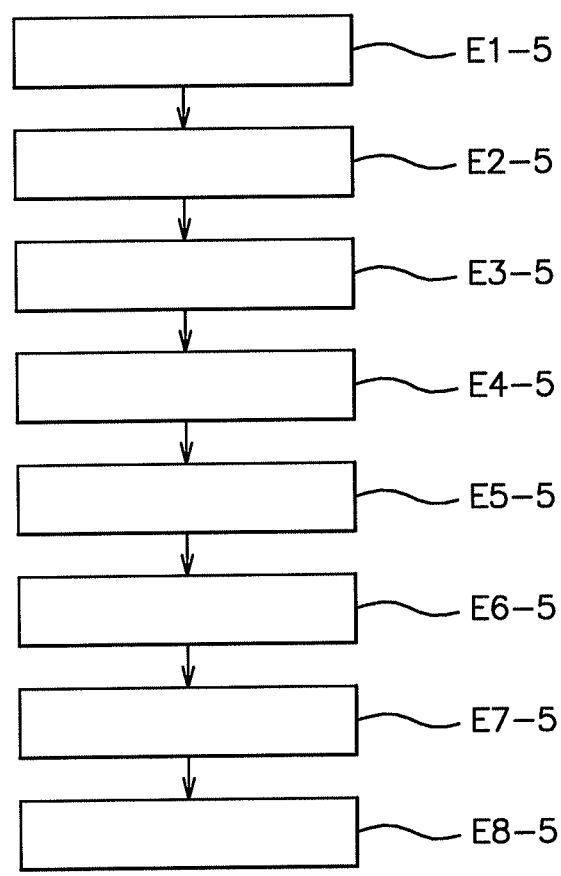
FIG. 8 is a flow diagram of a fifth embodiment of the method according to an aspect of the invention.

This fifth embodiment, illustrated in FIG. 8, is implemented by the third form of embodiment of the system 1C described hereinabove.

In this fifth embodiment, the receiving module 100C of the user equipment 10C first of all, in a step E1-5, receives a signal containing an advertising message, emitted periodically by the sending module 200C of the vehicle 20C.

Next, in a step E2-5, the measurement module 110C of the user equipment 10C measures the strength of the signal received by the receiving module 100C and takes measurements of the accelerations and/or gyroscopic angles of the user equipment 10C which will allow the position-determining module 230C of the vehicle 20C to determine the position of the user equipment 10C with respect to the body of the user 5.

In a step E3-5, the user equipment 10C sends a confirmation message to the receiving module 220C of the vehicle 20C, indicating that it has indeed received the advertising message. This message contains information (the RSSI) regarding the strength of the signal received from the vehicle 20C by the user equipment 10C, as well as gyroscopic angle and/or acceleration measurements measured respectively by the gyroscope and/or the accelerometer of the user equipment 10C in the preceding step E2-5.

The position-determining module 230C of the vehicle 20C then, in a step E4-5, determines the position of the user equipment 10C from the gyroscopic angle and acceleration measurements and the RSSI information received.

The calculation module 240C of the vehicle 20C then, in a step E5-5, calculates or determines a (theoretical) compensated value for the strength of the signal received, from the determined position of the user equipment 10C, and from the information regarding the strength of the signal received from the vehicle by the equipment 10C. This compensated value corresponds to the true value of the strength of, the signal received increased by an amount that compensates for the signal power absorbed by the body of the user 5 according to the position, namely to the orientation, of the user equipment 10C.

The estimation module 250C of the vehicle 20C then, in a step E6-5, estimates the distance D separating it from the user equipment 10C, from the calculated compensated strength value.

The presence-determining module 260C of the vehicle 20C then, in a step E7-5, determines whether the user equipment 20C is located in the predetermined detection zone ZD around the vehicle 20C, from the estimated distance value D.

If it is, the activation module 270C activates a function of the vehicle 20C in a step E8-5.

In the five embodiments described, a step of detecting a change in position of the user equipment 10A, 10B, 10C can be carried out constantly in parallel, for example periodically, so as to account for any change in position of the user equipment 10A, 10B, 10C with respect to the body of the user 5.

In addition, when the user equipment 10A, 10B, 10C is in listening mode listening for a signal containing an advertising message, the vehicle 20A, 20B, 20C periodically sends these signals at a low frequency, for example every 10 s, so as to reach a compromise between the reaction time and the energy consumption of the vehicle 20A, 20B, 20C. The user equipment 10A, 10B, 10C detects the signal originating from the vehicle when it lies within the detection zone. The user equipment 10A, 10B, 10C then indicates its presence in this detection zone by sending to the vehicle 20A, 20B, 20C a signal containing a response message. On receipt of this message, the vehicle 20A, 20B, 20C switches into a mode referred to as "fast advertising" in which exchanges of messages are performed at a higher frequency, for example every 100 ms, so as to reduce the reaction time for communication with the user equipment 10A, 10B, 10C. In addition, this increase in frequency allows the user to be located more precisely. For example, with exchanges of messages every 10 s, if a user is walking at 1.4 m/s, he will have covered 14 m, between two receipts of advertising messages, and this is not enough to activate a function of the vehicle 20A, 20B, 20C effectively, whereas at a frequency of 100 ms, the user covers only 14 cm, between two advertising messages, thereby allowing the user to be detected in the detection zone precisely and allowing a function of the vehicle 20A, 20B, 20C to be activated effectively.

It should be noted, lastly, that the present invention is not limited to the examples described above, and is open to many variants that are accessible to those skilled in the art.

The invention claimed is:

1. A method for activating a function of a motor vehicle following detection of the presence of user equipment in a predetermined detection zone around said vehicle, said method comprising:
   determining, by the user equipment in real time, a position of the user equipment relative to the body of the user, where the user equipment includes:
      at least one inertial sensor, such that the determining of the position of the equipment relative to the body of the user is performed using a signature of the position of the user equipment in three dimensions of space, and/or,
      at least one gyroscope, such that the determining of the position of the equipment relative to the body of the user is performed from an analysis of data from one axis of the gyroscope, which is perpendicular to an axis of the inertial sensor that is predominantly affected by gravity,
   receiving, by the user equipment, a signal containing an advertising message sent by the vehicle,
   calculating, by the user equipment, a compensated strength value for the strength of the signal received, from the determined position of the user equipment, the compensated strength value compensating for a reduction in received strength of the signal caused by the position of the user equipment relative to the body of the user,
   estimating, by the user equipment, a distance separating the user equipment from the vehicle, from the calculated compensated strength value, and
   activating, by the vehicle, at least one function by the vehicle when the estimated distance is below a predetermined threshold.

2. The method as claimed in claim 1, further comprising:
   determining, by the user equipment, its position with respect to the body of the user, in real time and periodically, with the user equipment including at least one inertial sensor, the determining of the position of the equipment with respect to the body of the user is performed using the signature of the position of the user equipment in the three dimensions of space, and/or, with the user equipment including at least one gyroscope, the determining of the position of the equipment with respect to the body of the user is performed from an analysis of data from one axis of the gyroscope, which is perpendicular to an axis of the inertial sensor that is predominantly affected by gravity, receiving, by the user equipment, a signal containing an advertising message, sent by the vehicle calculating, by the user equipment, a compensated value for the strength of the signal received, from the determined position of the user equipment estimating, by the user equipment, the distance separating it from the vehicle, from the calculated compensated strength value, sending, by the user equipment, this estimated distance value to the vehicle, determining, by the vehicle, whether the user equipment is located in a predetermined detection zone around said vehicle, from the distance value sent by the user equipment, and activating, by the vehicle at least one function when the user equipment is determined to be located in the predetermined detection zone around said vehicle.

3. The method as claimed in claim 1, further comprising:

receiving, by the user equipment, a signal containing an advertising message, sent by the vehicle, determining, by the user equipment, its position with respect to the body of the user, in real time, with the user equipment including at least one inertial sensor, the determining of the position of the equipment with respect to the body of the user is performed using the signature of the position of the user equipment in the three dimensions of space, and/or, with the user equipment including at least one gyroscope, the determining of the position of the equipment with respect to the body of the user is performed from an analysis of data from one axis of the gyroscope, which is perpendicular to an axis of the inertial sensor that is predominantly affected by gravity, calculating, by the user equipment, a compensated value for the strength of the signal received, from the determined position of the user equipment, estimating, by the user equipment, the distance separating it from the vehicle, from the calculated compensated strength value, sending, by the user equipment, this estimated distance value to the vehicle, determining, by the vehicle, whether the user equipment is located in a predetermined detection zone around said vehicle, from the distance value sent by the user equipment, and activating, by the vehicle at least one function when the user equipment is determined to be located in the predetermined detection zone around said vehicle.

4. The method as claimed in claim 1, further comprising:

determining, by the user equipment, its position with respect to the body of the user, in real time and periodically, with the user equipment including at least one inertial sensor, the determining of the position of the equipment with respect to the body of the user is performed using the signature of the position of the user equipment in the three dimensions of space, and/or, with the user equipment including at least one gyroscope, the determining of the position of the equipment with respect to the body of the user is performed from an analysis of data from one axis of the gyroscope, which is perpendicular to an axis of the inertial sensor that is predominantly affected by gravity, receiving, by the user equipment, a signal containing an advertising message, sent by the vehicle calculating, by the user equipment, a compensated value for the strength of the signal received, from the determined position of the user equipment, estimating, by the user equipment, the distance separating it from the vehicle, from the calculated compensated strength value, determining, by the user equipment, whether it is located in a predetermined detection zone around said vehicle, from the estimated distance value, sending, by the user equipment, a command message to the vehicle, and activate at least one function following receipt of said command message when the user equipment is determined to be located in the predetermined detection zone around said vehicle.

5. The method as claimed in claim 1, further comprising:

receiving, by the user equipment, a signal containing an advertising message, sent by the vehicle, determining, by the user equipment, its position with respect to the body of the user, in real time, with the user equipment including at least one inertial sensor, the determining of the position of the equipment with respect to the body of the user is performed using the signature of the position of the user equipment in the three dimensions of space, and/or, with the user equipment including at least one gyroscope, the determining of the position of the equipment with respect to the body of the user is performed from an analysis of data from one axis of the gyroscope, which is perpendicular to an axis of the inertial sensor that is predominantly affected by gravity, calculating, by the user equipment, a compensated value for the strength of the signal received, from the determined position of the user equipment, estimating, by the user equipment, the distance separating it from the vehicle, from the calculated compensated strength value, determining, by the user equipment, whether it is located in a predetermined detection zone around said vehicle, from the estimated distance value, sending, by the user equipment, a command message to the vehicle, and activate at least one function following receipt of said command message when the user equipment is determined to be located in the predetermined detection zone around said vehicle.

6. The method as claimed in claim 1, further comprising:

receiving, by the user equipment, a signal containing an advertising message, sent by the vehicle, sending, by the user equipment, a confirmation message to the vehicle, indicating that it has correctly received the advertising message, said confirmation message containing information regarding the strength of the signal received from the vehicle by the user equipment and gyroscopic angle and/or acceleration data collected by the user equipment, determining, by the user equipment in real time, the position of the user equipment with respect to the user from the gyroscopic angle and/or acceleration data received, the determining of the position of the equipment with respect to the body of the user is performed using the signature of the position of the user equipment in the three dimensions of space, and/or, the determining of the position of the equipment with respect to the body of the user is performed from an analysis of data from one axis of the gyroscope, which is perpendicular to an axis of the inertial sensor that is predominantly affected by gravity, calculating, by the user equipment, a compensated value for the strength of the signal received, from the determined position of the user equipment, and from the information regarding the strength of the signal received from the vehicle by the equipment, estimating, by the user equipment, the distance separating it from the user equipment, from the calculated compensated strength value, determining, by the vehicle, whether the user equipment is located in a predetermined detection zone around said vehicle, from the estimated distance value, and activating, by the vehicle, at least one of its functions when the user equipment is determined to be located in the predetermined detection zone around said vehicle.

7. User equipment allowing activation of at least one function of a motor vehicle following detection of the presence of said user equipment in a predetermined detection zone around said vehicle, said user equipment comprising:

a processor for determining a position of the user equipment with respect to the body of the user, at least one inertial sensor, the determining of the position of the equipment with respect to the body of the user being performed using the signature of the position of the user equipment in the three dimensions of space, at least one gyroscope, the determining of the position of the equipment with respect to the body of the user being performed from an analysis of data from one axis of the gyroscope, which is perpendicular to an axis of the inertial sensor that is predominantly affected by gravity, wherein the processor is configured to:

receive a signal containing an advertising message, sent by the vehicle calculate a compensated strength value for the strength of the signal received, from the determined position of the user equipment, the compensated strength value compensating for a reduction in received strength of the signal caused by the position of the user equipment relative to the body of the user, and estimate the distance separating it from the vehicle, from the calculated compensated strength value.

8. A motor vehicle comprising equipment defining functions, said vehicle being able to activate at least one of its functions following detection of the presence of user equipment as claimed in claim 7 in a predetermined detection zone around said vehicle, wherein the processor is further configured to:

receive a distance value sent by the user equipment, determine the presence of the user equipment in a predetermined detection zone around said vehicle, from the distance value received, and activate at least one function of the vehicle.

9. A motor vehicle comprising equipment defining functions, said vehicle being able to activate at least one of its functions following detection of the presence of user equipment in a predetermined detection zone around said vehicle, said vehicle comprising:

a processor configured to:

send a signal containing an advertising message, receive a confirmation message, sent by the user equipment, said confirmation message containing a value for the strength measured by the user equipment and gyroscopic angle and/or acceleration measurements collected by the user equipment, determine the position of the user equipment from the gyroscopic angle and/or acceleration measurements received, the determining of the position of the equipment with respect to the body of the user being performed using the signature of the position of the user equipment in the three dimensions of space, and/or, the determining of the position of the equipment with respect to the body of the user being performed from an analysis of data from one axis of the gyroscope, which is perpendicular to an axis of the inertial sensor that is predominantly affected by gravity, calculate a compensated strength value for the strength of the signal received, from the determined position of the user equipment, and from the information regarding the strength of the signal received from the vehicle by the equipment, the compensated strength value compensating for a reduction in received strength of the signal caused by the position of the user equipment relative to the body of the user, estimate the distance separating the vehicle from the user equipment, from the calculated compensated strength value, determine the presence of the user equipment in a predetermined detection zone around said vehicle, from the estimated distance value, and activate at least one function of the vehicle.

\* \* \* \* \*